US012377584B2

(12) United States Patent
Bazzica (10) Patent No.: US 12,377,584 B2
(45) Date of Patent: Aug. 5, 2025

(54) METHOD AND MOLD FOR MOLDING A FOAMED PLASTIC FOLDABLE CONTAINER, AND CONTAINER MANUFACTURED THEREBY

(71) Applicant: BAZZICA ENGINERRING S.R.L., Trevi (IT)

(72) Inventor: Carlo Bazzica, Matigge di Trevi-Foligno (IT)

(73) Assignee: BAZZICA ENGINEERING S.RL., Trevi (IT)

( * ) Notice: Subject to any disclaimer, the term of this patent is extended or adjusted under 35 U.S.C. 154(b) by 583 days.

(21) Appl. No.: 17/612,500

(22) PCT Filed: May 20, 2020

(86) PCT No.: PCT/IB2020/054786
§ 371 (c)(1),
(2) Date: Nov. 18, 2021

(87) PCT Pub. No.: WO2020/234799
PCT Pub. Date: Nov. 26, 2020

(65) Prior Publication Data
US 2022/0227029 A1    Jul. 21, 2022

(30) Foreign Application Priority Data

May 20, 2019   (IT) .......................... 102019000007020

(51) Int. Cl.
*B29C 44/58*    (2006.01)
*B29C 44/10*    (2006.01)
(Continued)

(52) U.S. Cl.
CPC ............ *B29C 44/585* (2013.01); *B29C 44/10* (2013.01); *B65D 1/225* (2013.01); *B29K 2101/12* (2013.01); *B29L 2031/712* (2013.01)

(58) Field of Classification Search
CPC ....... B29C 44/585; B29C 44/10; B65D 1/225; B29K 2101/12; B29L 2031/712
(Continued)

(56) References Cited

U.S. PATENT DOCUMENTS 4,235,346 A * 11/1980 Liggett .................. B65D 1/225
  220/675
6,446,825 B1 * 9/2002 Godoy ............... B65D 11/1833
  220/6
6,938,789 B1 * 9/2005 Matias ................ B65D 11/184
  220/6

FOREIGN PATENT DOCUMENTS

DE   19640541 A1   4/1998
EP    3057759 A1   8/2016
(Continued)

OTHER PUBLICATIONS

International Search Report and Written Opinion, dated Oct. 15, 2020, in connection with International Application No. PCT/IB2020/054786 (17 pages).
(Continued)

*Primary Examiner* — Orlando E Aviles
*Assistant Examiner* — Niki M Eloshway
(74) *Attorney, Agent, or Firm* — Klintworth & Rozenblat LLP (57) ABSTRACT

A foamed plastic foldable container has a first wall, a pair of mutually facing second walls hingedly coupled to the first wall, a pair of mutually facing third walls hingedly coupled to the first wall, and a closing wall defined by at least one panel hingedly coupled to one of the second walls.

19 Claims, 10 Drawing Sheets

(51) Int. Cl.
   *B29L 31/00*   (2006.01)
   *B65D 1/22*   (2006.01)
   *B29K 101/12*   (2006.01)

(58) Field of Classification Search
   USPC .............................................................. 220/6
   See application file for complete search history.

(56) References Cited

FOREIGN PATENT DOCUMENTS

| | | |
|---|---|---|
| FR | 2186348 A1 | 1/1974 |
| WO | 2012028567 A1 | 3/2012 |
| WO | 2015056181 A1 | 4/2015 |
| WO | 2015058246 A1 | 4/2015 |
| WO | 2018112506 A1 | 6/2018 |
| WO | WO-2020234799 A1 * 11/2020 ......... B29C 37/0057 |

OTHER PUBLICATIONS

Written Opinion of the International Preliminary Examining Authority, dated Apr. 29, 2021, in connection with International Application No. PCT/IB2020/054786 (7 pages).

Notification of Transmittal of the International Preliminary Report on Patentability, dated Aug. 23, 2021, in connection with International Application No. PCT/IB2020/054786.

* cited by examiner

METHOD AND MOLD FOR MOLDING A FOAMED PLASTIC FOLDABLE CONTAINER, AND CONTAINER MANUFACTURED THEREBY

CROSS-REFERENCE TO CO-RELATED PATENT APPLICATIONS

This application claims the priority of the Italian patent application no. 102019000007020 filed on 20 May 2019, the content of which is incorporated herein as reference.

TECHNICAL FIELD

The present invention relates to a method and to a mold for molding a foamed plastic foldable container, and to the container manufactured thereby.

STATE OF THE PRIOR ART

In particular, the present invention relates to a foldable container made of foamed plastic, for example polypropylene, polyethylene, polystyrene and their copolymers, of the type described in the document WO-A-2012028567.

The container has a parallelepiped shape, and comprises a first wall substantially flat, a pair of mutually facing second walls hinged to the first wall, and a pair of mutually facing third walls also hinged to the first wall.

The container can assume an upright working configuration, wherein the second walls and the third walls are in an upright configuration, i.e. the second walls are parallel to one another and perpendicular to the first wall and the third walls are parallel to one another and perpendicular to the first wall and to the second walls to allow the use of the container, and a flattened folded configuration, wherein the first wall, the second walls, and the third walls are mutually parallel and overlapping to reduce the size of the container and allow its transport and storage.

In the upright configuration, the container is cup-shaped and is closed by a lid mounted and blocked in a releasable manner on the second walls and on the third walls.

Since the closing of the known foamed plastic foldable containers of the type described above involves the use of a first mold for the manufacturing of the containers, the use of a second mold for the manufacturing of the lids, and the storage of both the containers and the lids, such containers are relatively complex and costly and involve relatively high management costs.

OBJECT OF THE INVENTION

The object of the present invention is to manufacture a mold for molding foamed plastic foldable containers which resolves the drawbacks described above and which is easy and economical to implement.

According to the present invention, a mold for molding foamed plastic foldable containers is manufactured according to what claimed in claims from 1 to 7.

Moreover, the present invention relates to a method for molding foamed plastic foldable containers.

According to the present invention, a method for molding foamed plastic foldable containers is provided according to what claimed in claims from 8 to 14.

Finally, the present invention relates to a foamed plastic foldable container.

According to the present invention, a foamed plastic foldable container is manufactured according to what claimed in claims from 15 to 19.

BRIEF DESCRIPTION OF THE DRAWINGS

The invention will now be described with reference to the attached drawings, which illustrate a non-limiting embodiment, wherein.

Figures from 5 to 8 are four schematic views in cross-section, with parts removed for the sake of clarity, of a detail of the mold of FIG. 1 illustrated in four different working positions.

PREFERRED EMBODIMENT OF THE INVENTION

Figure 1:
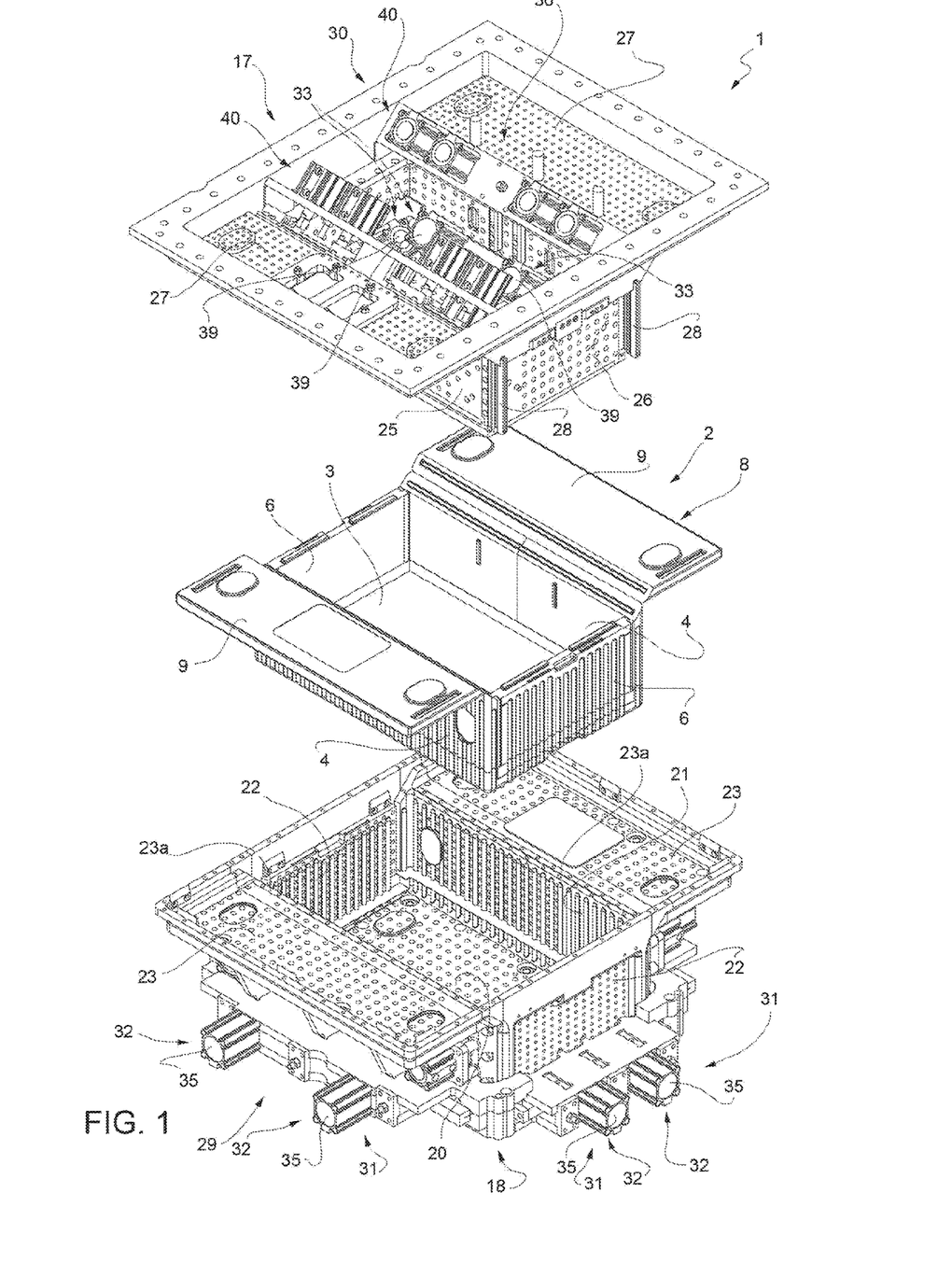
FIG. 1 is an exploded perspective view of a preferred embodiment of the mold and of the container according to the present invention.
Figure 9:
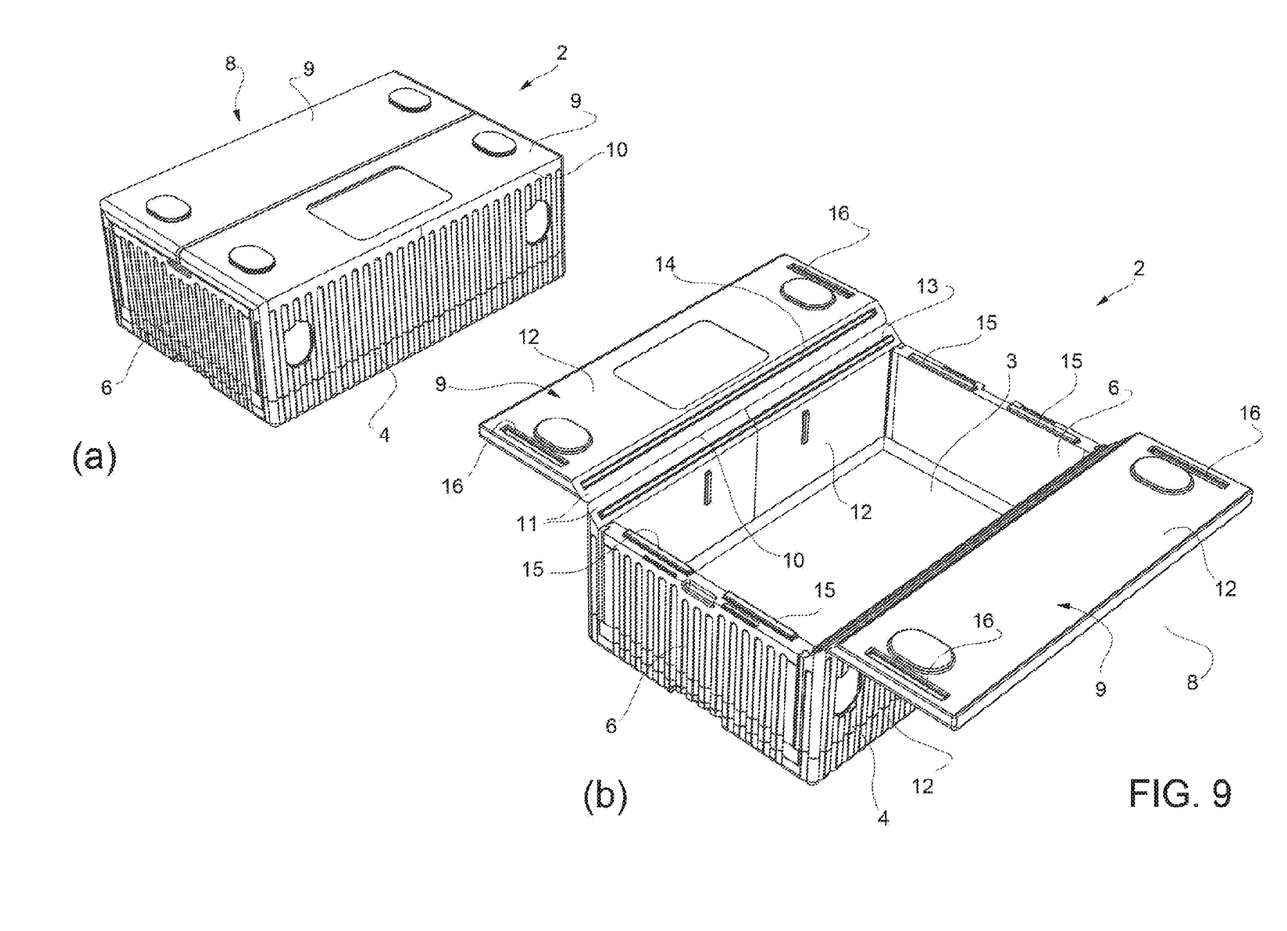
FIGS. 9 and 10 are four schematic perspective views of the container of FIG. 1 illustrated in different configurations.
Figure 10:
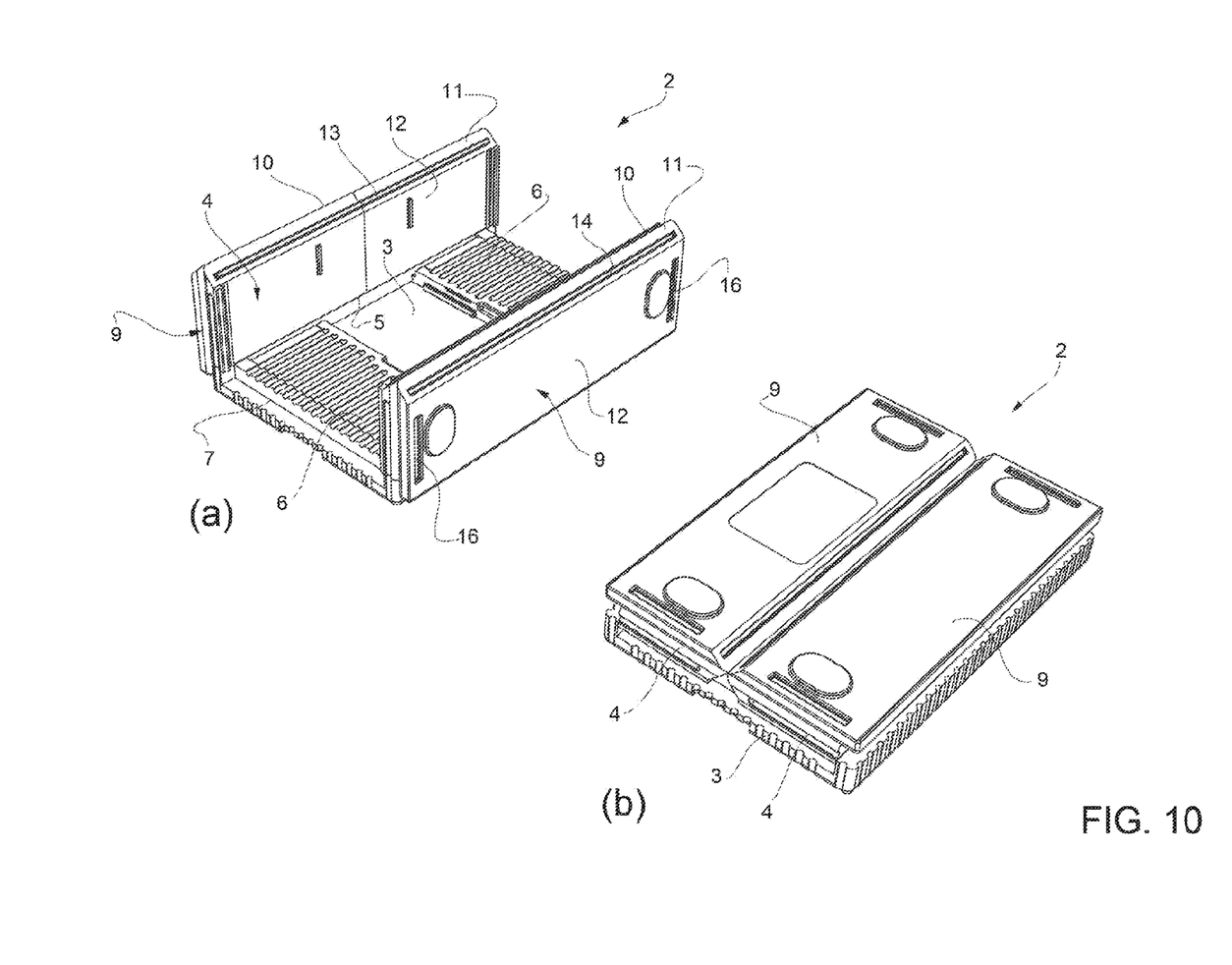

With reference to FIGS. 1, 9, and 10, reference number 1 refers, in its whole, to a mold designed to be installed in a machine (not illustrated) for molding foamed plastic, for instance polypropylene, polyethylene, polystyrene and their copolymers, for the manufacturing of a foldable container 2 having the shape of a parallelepiped box and configured for housing products (not illustrated) of a varied nature inside therein.

The container 2 comprises a substantially rectangular first wall 3; two mutually facing second walls 4 rotatably coupled to the wall 3 at respective connection hinges 5; two mutually facing third walls 6 rotatably coupled to the wall 3 at respective connections hinges 7 which are transverse to the hinges 5; and a closing wall 8.

According to the preferred embodiment illustrated in the attached Figures, the wall 8 comprises two panels 9, each of which is rotatably coupled to a corresponding wall 4 at a respective connection hinge 10. According to a variant not illustrated, the wall 8 can be monolithic and hinged to one of the walls 4.

According to the illustrations shown in FIGS. 9a, 9b, 10b and 10b, the container 2 can assume a working or upright configuration (FIG. 9a), wherein the walls 4 are parallel to one another and perpendicular to the wall 3; the walls 6 are parallel to one another and perpendicular to the walls 3 and 4; and the wall 8 is movable between a closing position of the container 2, wherein the wall 8 faces and is parallel to the wall 3, and an opening position of the container 2, wherein the wall 8 is turned outwards in order to leave the entry opening of the container 2 free.

In particular, in the opening position of the container 2, the panels 9 can assume the position illustrated in FIG. 9b or positions turned more towards the respective walls 4 to which they are hinged, up to a maximum rotation position, wherein each panel 9 is in contact with the respective wall 4 (FIG. 10a).

In particular, in the closing position of the container 2, the panels 9 of the wall 8 are arranged in contact with the walls 4 at respective coupling faces 11, which are arranged on opposite sides of, and contiguous with, the hinge 10 and are inclined with respect to larger faces 12 of the walls 4 and panels 9.

According to the illustration shown in FIG. 9b, the face 11 obtained on the panel 9 is contiguous with the inside face 12 of the panel 9, i.e. with the face 12 which, in the closing position of the container 2, is turned towards the inside of the container 2, and the face 11 obtained on the panel 4 is contiguous with the inside surface 12 of the wall 4.

Advantageously, moreover, the faces 11 are inclined with respect to the respective surfaces 12 of an angle such that the faces 11 are coplanar in the opening position of the container 2 illustrated in FIG. 9b, which, as will become evident in the following, is a position of deformation of the container 2 by the mold 1.

Furthermore, the container 2 can take a folded or flattened configuration (FIG. 10b), wherein the walls 6 are folded onto the wall 3, the walls 4 are folded onto the walls 6, and the panels 9 are folded onto the walls 4.

Advantageously, according to the illustrations shown in FIGS. 9a and 9b, each panel 9 is blocked in a releasable manner in its closing position by means of the engagement of a protrusion 13 obtained on the face 11 of the corresponding wall 4 parallel to the corresponding hinge 10 in a recess 14 obtained on the face 11 of the panel 9 and the engagement of a protrusion 15 obtained on each wall 6 parallel to the corresponding hinge 7 in a recess 16 obtained on the face 12 of the panel 9.

The mold 1 comprises two half-molds 17 and 18 movable with respect to one another and towards a working molding position, wherein the half-mold 17 extends inside the half-mold 18 and the two half-molds 17 and 18 are coupled to one another in a fluid-tight manner to define a molding chamber 19 having the shape of the container 2 in its upright configuration and with the panels 9 arranged in their opening positions.

The half-mold 18 has the shape of a box-like body and comprises a bottom floor 20, two lateral walls 21 perpendicular to the wall 20, and two lateral walls 22 perpendicular to the walls 20 and 21.

Figure 2:
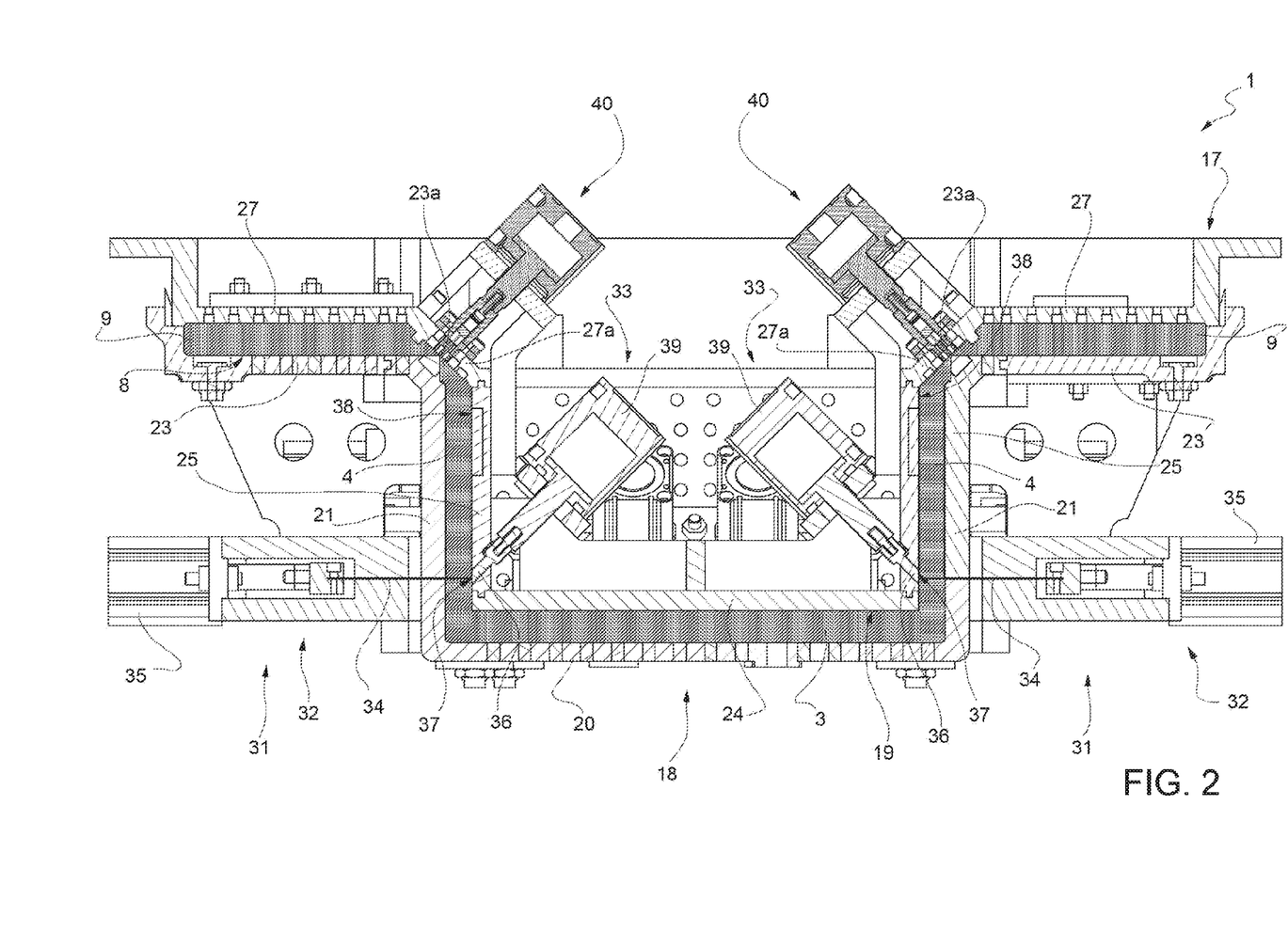
FIG. 2 is a first cross-sectional schematic view, with parts removed for the sake of clarity, of the mold of FIG. 1.
Figure 3:
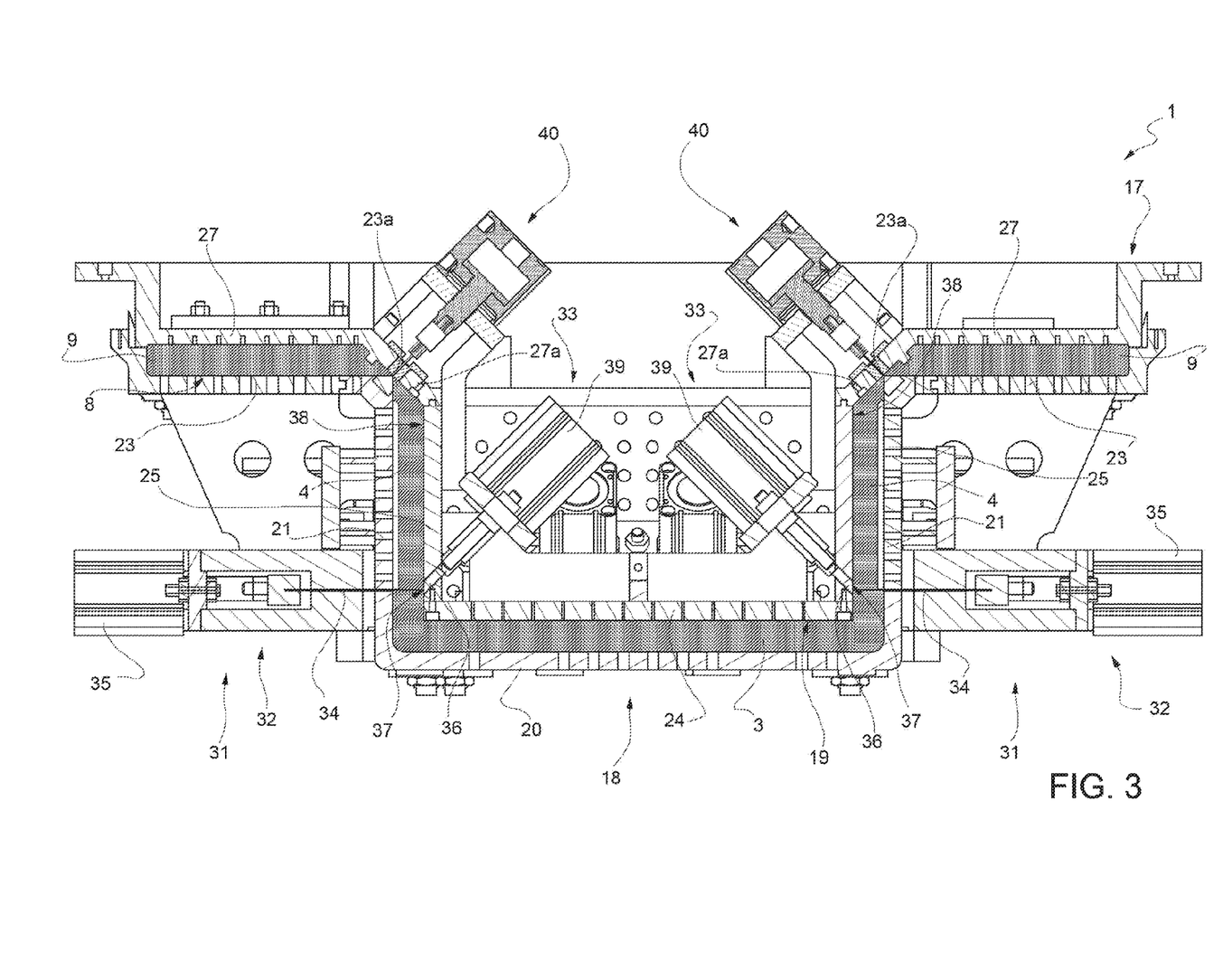
FIG. 3 is a second cross-sectional schematic view, with parts removed for the sake of clarity, of the mold of FIG. 1.

Furthermore, according to the illustrations shown in FIGS. 1, 2, and 3, the half-mold 18 comprises two upper walls 23, which protrude outside the walls 21, are perpendicular to the walls 21, and define, together with the corresponding walls 21, respective upper edges 23a.

The half-mold 17 has the shape of a box-like body and comprises a bottom floor 24, two lateral walls 25 perpendicular to the wall 24, and two lateral walls 26 perpendicular to the walls 24 and 25.

The half-mold 17 further comprises two upper walls 27, which protrude outside the walls 25, are perpendicular to the walls 25, and are each connected to a corresponding wall 25 by the interposition of a joining wall 27a.

The wall 27a is inclined with respect to the walls 25 and 27, preferably but not necessarily at an angle of substantially 45°, and is coplanar with the corresponding edge 23a.

The half-mold 17b is further provided at each edge defined between each pair of mutually adjacent walls 25, 26 with a corresponding dividing flap 28, which protrudes outside the half-mold 17, and extends between the two half-molds 17 and 18 to separate each wall 4 of the container 2 from the adjacent wall 6.

Furthermore, the mold 1 comprises a first forming assembly 29 configured to form the hinges 5 and 7 and a second forming assembly 30 configured to form the hinges 10.

The forming assembly 29 comprises, for each hinge 5, 7, a respective forming unit 31 comprising, in turn, a parting device 32 mounted outside the half-mold 18 and a compression device 33 mounted inside the half-mold 17 to cooperate with the parting device 32.

Figure 4:
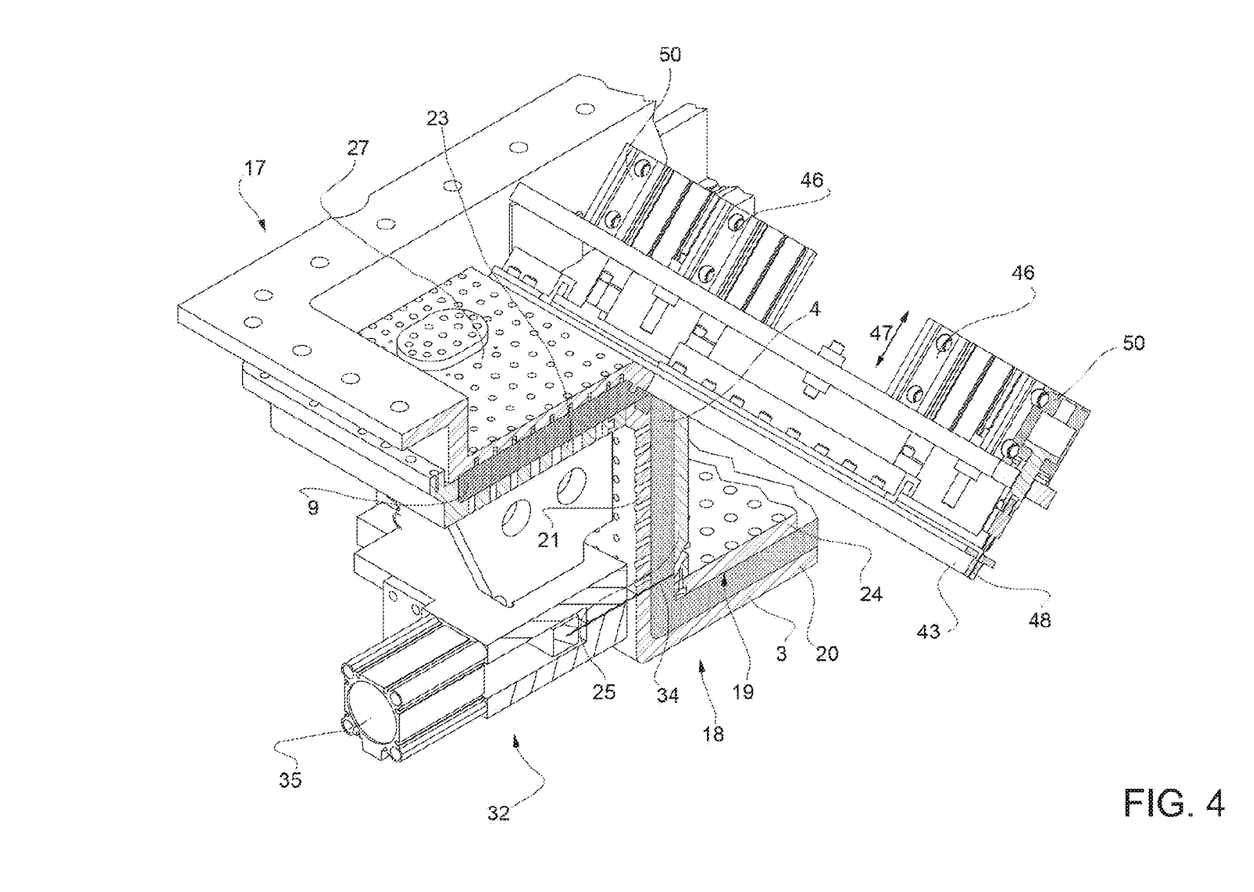
FIG. 4 is a schematic perspective view, with parts in cross-section and parts removed for the sake of clarity, of a detail of the mold of FIG. 1.
Figure 5:
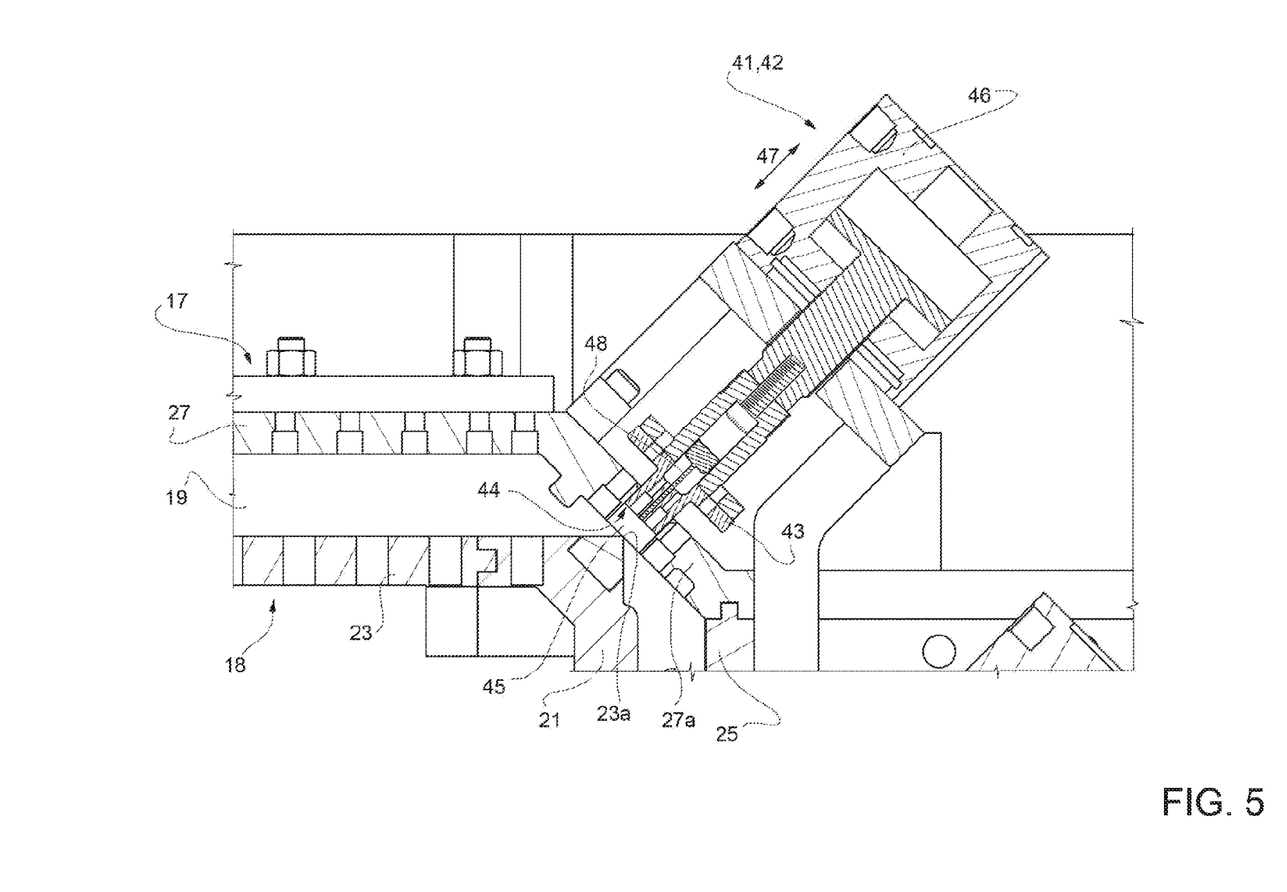

With reference to FIGS. 2, 3, and 4, the device 32 comprises a blade 34, which extends along the corresponding hinge 5, 7 parallel to the wall 3, is substantially coplanar with the corresponding hinge 5, 7, and is engaged in a sliding manner through the corresponding wall 21, 22.

The blade 34 is moved by actuating cylinders 35 fixed to the half-mold 18 between a rearward position (not illustrated), wherein the blade 34 is arranged outside the chamber 19, and a forward position (FIGS. 2, 3, 4), wherein the blade 34 extends inside the chamber 19.

The device 33 comprises a buffer 36, which extends along the corresponding hinge 5, 7, is inclined with respect to the corresponding wall 25, 26, and is limited by an end face 37 parallel to an outside face 38 of the corresponding wall 25, 26.

The buffer 36 is engaged in a sliding manner through the corresponding wall 25, 26, and is moved by actuating cylinders 39 fixed to the half-mold 17 between a rearward position (not illustrated), wherein the buffer 36 extends outside the chamber 19 and limits inside the corresponding wall 25, 26 a variable-volume chamber (not illustrated) connected to the chamber 19, and a forward position (FIGS. 2 and 3), wherein the face 37 is arranged substantially coplanar with the face 38 of the corresponding wall 25, 26.

According to the illustrations shown in FIGS. 5, 6, 7, and 8, the forming assembly 30 comprises, for each hinge 10, a respective forming unit 40 comprising, in turn, a parting device 41 and a compression device 42 mounted on one of the two half-molds 17 or 18 and configured to cooperate with each other. In the example illustrated in the attached figures, the parting device 41 and the compression device 42 are mounted on the wall 27a of the half-mold 17.

The device 42 comprises a compressor 43, which preferably has the shape of a parallelepiped bar, extends along the corresponding hinge 10, and is limited by a substantially flat end face 44.

The compressor 43 engages the corresponding wall 27a in a sliding manner to define, together with the wall 27a, a variable-volume chamber 45, which extends on opposite sides of the corresponding edge 23a, and communicates with the molding chamber 19.

The compressor 43 is moved by two mutually parallel actuating cylinders 46 in a forward direction 47 perpendicular to the wall 27a from and towards a forward position (FIGS. 7 and 8), wherein the face 44 is arranged substantially in contact with the edge 23a and the chamber 45 has a volume substantially equal to zero, and a rearward position (FIGS. 5 and 6), wherein the chamber 45 has its maximum volume.

With respect to the foregoing statements, it should be specified that:

when the compressors 43 of the two forming units 40 are simultaneously arranged in their forward positions, the chamber 19 is divided into a lower portion 19a having the shape of the walls 3, 4, and 6 and into two upper portions 19b each having the shape of a panel 9 of the wall 8; and when the compressors 43 of the two forming units 40 are arranged simultaneously in their rearward positions, the portion 19a communicates with the portions 19b by means of the corresponding chambers 45.

The device 41 comprises a blade 48, which extends along the corresponding hinge 10, is parallel to the direction 47, and is aligned with the edge 23a in the direction 47.

The blade 48 is arranged on the same side of the compressor 43, relative to the chamber 19, and is engaged in a sliding manner through the compressor 43 in order to define, together with the compressor 43, a variable-volume chamber 49 communicating with the chamber 19.

The blade 48 is moved by two mutually parallel actuating cylinders 50 in the direction 47 between a rearward position (FIG. 5), wherein the chamber 49 has its maximum volume and the portion 19b communicates with the portion 19a by means of the chamber 49, and a forward position (FIGS. 6 and 8), wherein the blade 48 is arranged substantially in contact with the edge 23a, the chamber 49 has a volume substantially equal to zero, and the portion 19b is substantially separate from the portion 19a.

Figure 6:
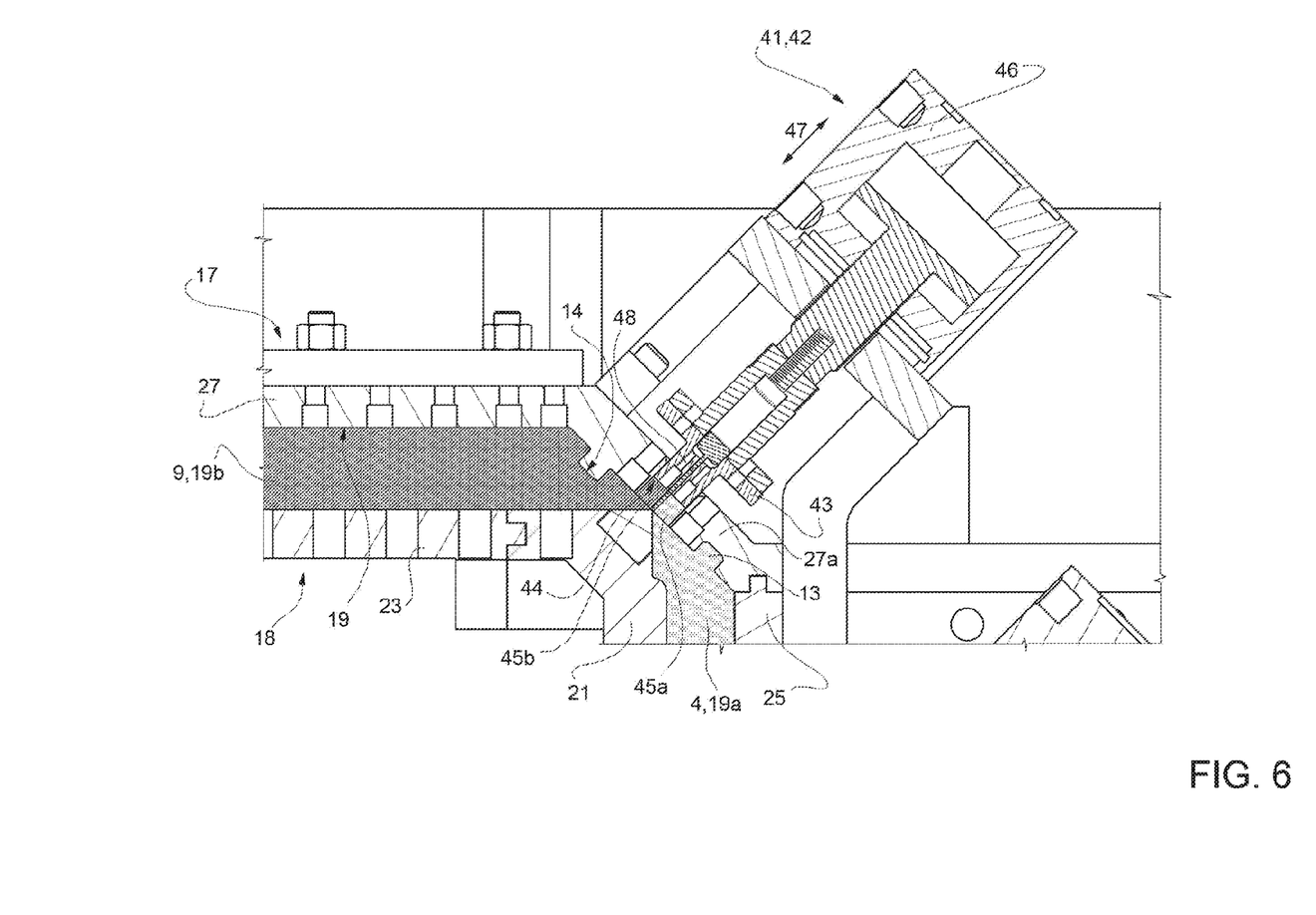

The operation of the mold 1 will now be described with reference to FIGS. 2 and from 5 to 8 and as of a moment when (FIG. 6):

the two half-molds 17 and 18 are arranged in the molding working position and form the chamber 19 therebetween;

the compressor 43 of each forming unit 40 is arranged in its rearward position; and the blade 48 of each forming unit 40 is arranged in its forward position.

When the compressor 43 of each forming unit 40 is arranged in its rearward position and the corresponding blade 48 is arranged in its forward position, the corresponding portion 19b is separated from the portion 19a and the corresponding chamber 45 is divided into two portions 45a, 45b connected to the portion 19a and, respectively, to the corresponding portion 19b.

The plastic material is then fed into the portions 19a and 45a and into the portions 19b and 45b to form the walls 3, 4, and 6 and the panels 9 of the wall 8.

In this regard, since each blade 48 separates the section defined by the portion 19a and by the corresponding portion 45a from the section defined by the corresponding portions 19b and 45b, the plastic material fed into the portions 19a and 45a can be different from the plastic material fed into the portions 19b and 45b. In this way, the panels 9 of the closing wall 8 can be different, for example in colour, from the walls 3, 4, and 6 of the container 2.

Following, the hinges 5 and 7 are formed by the forming units 31 of the forming assembly 29 by combining the action of the blades 34 with the action of the buffers 36 as described and illustrated in the European patent EP-3057759-B1 incorporated here in its entirety as reference.

Figure 7:
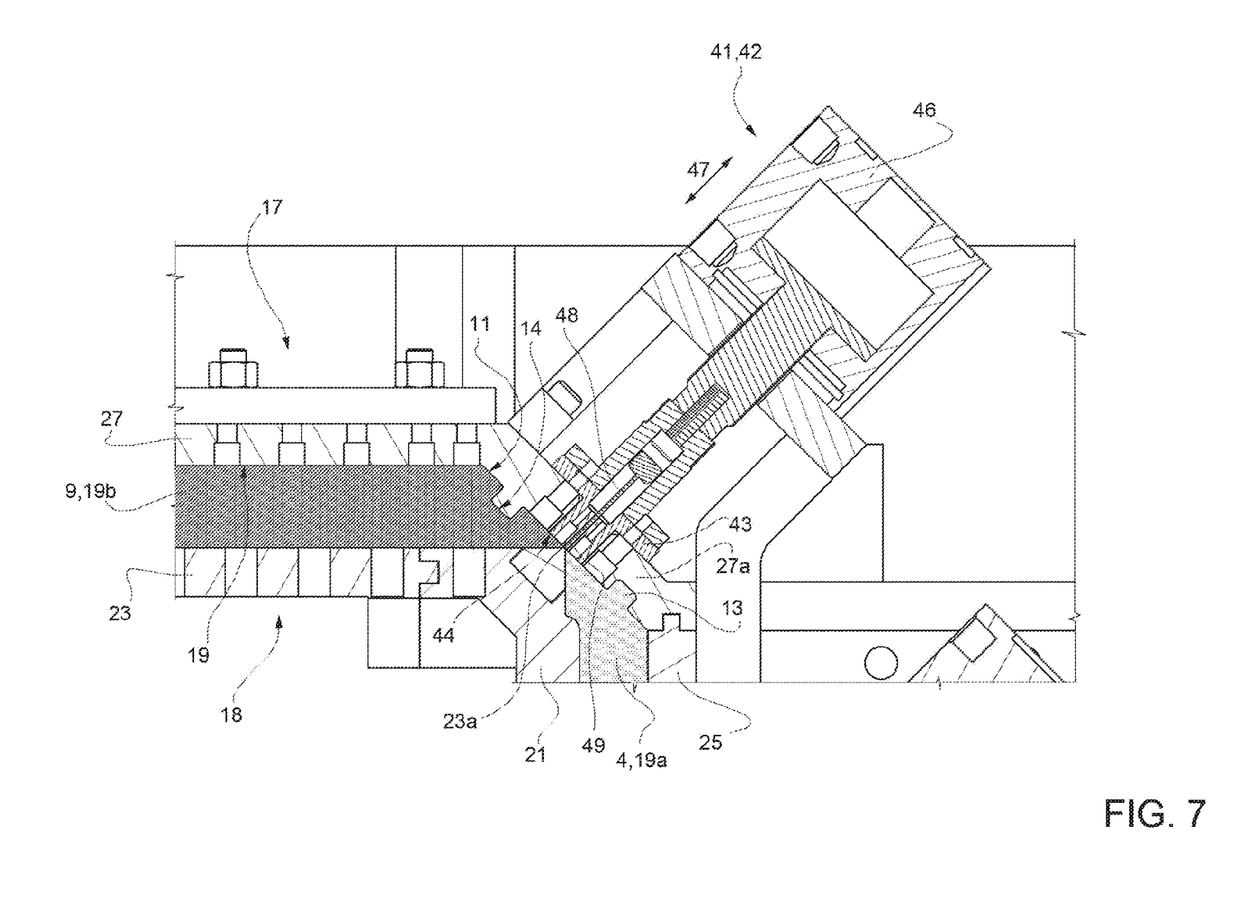
Figure 8:
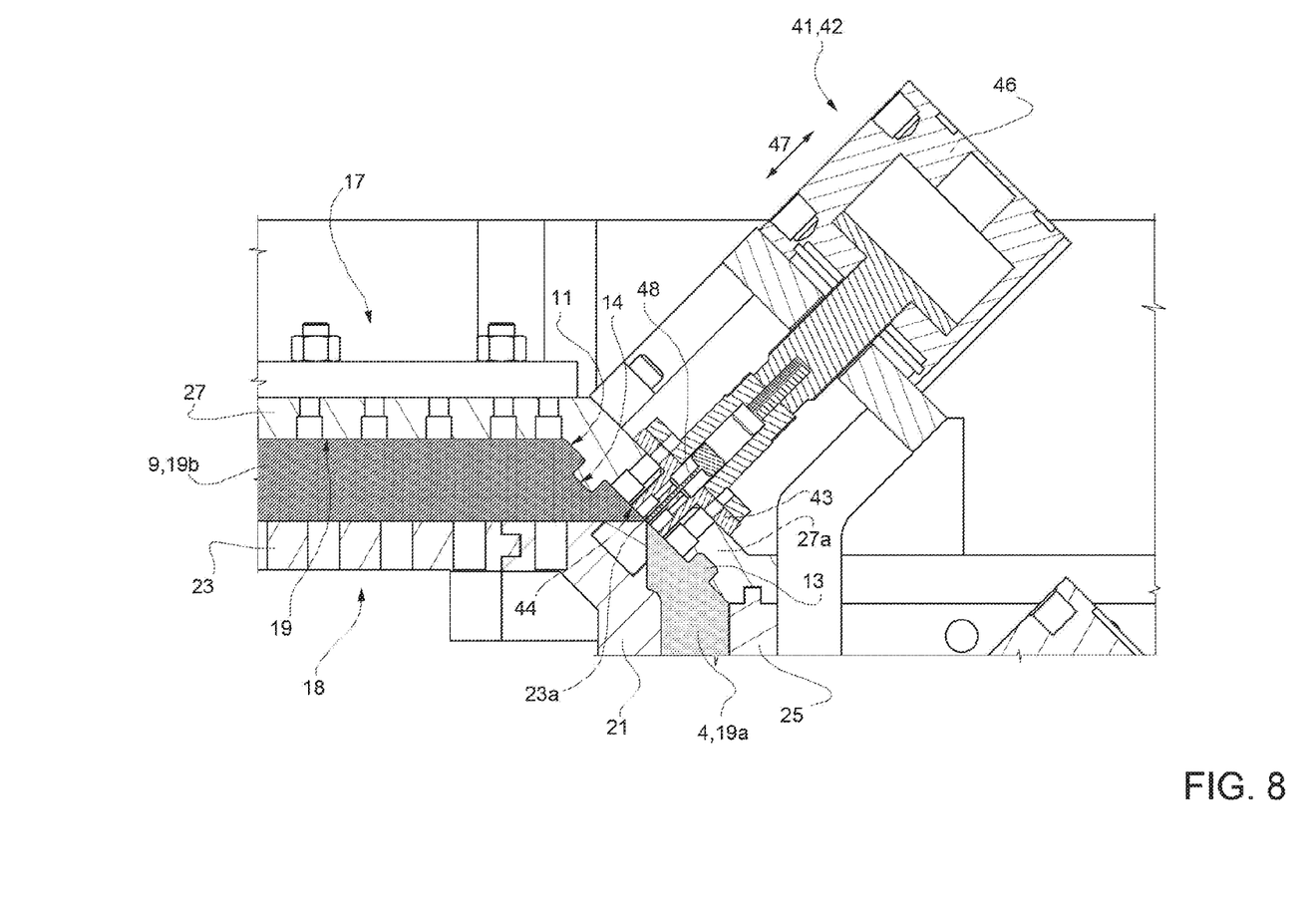

According to the illustrations shown in FIGS. 7 and 8, each hinge 10 is formed:

by moving the corresponding compressor 43 into its forward position to push into the portion 19a the plastic material contained in the corresponding portion 45a and push into the portion 19b the plastic material contained in the corresponding portion 45b and by moving the corresponding blade 48 first into its rearward position to allow the plastic material to enter into the corresponding chamber 49 and, then, towards its forward position to compress the plastic material contained in the chamber 49 and form the hinge 10.

With respect to the foregoing statements, it should be specified that, when the compressors 43 are moved into their forward positions and the blades 48 are moved first from their forward positions into their rearward positions and then from their rearward positions towards their forward positions, the plastic material is subjected to a flow of steam injected into the portion 19a and into the portions 19b.

Therefore, the compression of the plastic material contained in the portions 45a and 45b against the areas of the portion 19a and, respectively, 19b contiguous with the edge 23a occurs during the vaporization phase of the plastic material; analogously, the compression of the plastic material contained in the chamber 49 against the edge 23a occurs during the vaporization phase of the plastic material. This allows obtaining along, and on either side of, the edge 23a a higher-density area which makes the resulting hinge 10 particularly robust and capable of resisting a substantially unlimited number of openings/closings of the corresponding panel 9 during the lifetime of the container 2.

The mold 1 has some advantages mainly deriving from the fact that, at the end of the molding process, the container 2 is complete and provided with the closing wall 8 and, thus, does not involve the management, the storage, and the assembly of mutually separate pieces.

Moreover, the forming assembly 30 not only allows manufacturing an extremely robust hinge 10 along the edge 23a which connects the panels 9 to the rest of the container 2, but it advantageously allows manufacturing the closing wall 8 with a different type of material, in particular of a different colour, than that of the other walls of the container. In the case of the illustrated example, wherein the closing wall 8 is composed of two panels 9, the latter can be manufactured in the same colour or in a different one. This is possible due to the fact that the forming assembly 30, in particular the parting device 32, creates, during the feeding of the material into the molding chamber 19, a clear separation between the portion 19b of the molding chamber 19 intended to form the closing wall 8, i.e. the panels 9, and the portion 19a of the molding chamber 19 intended to form the walls 3, 4 and 6.

The description relating to the closing wall 8 is also valid, mutatis mutandis, for the other walls of the container 2. In other words, it is possible to associate a forming assembly 30 also with the hinges that connect the walls 4 and the walls 6 to the bottom floor 3. This way, it is possible to manufacture a container 2 having some or all the walls 3, 4, 6 and 8 in different colours between each other.

The invention claimed is:

1. A foamed plastic foldable container comprising a first wall; a pair of mutually facing second walls hingedly coupled to the first wall; and a pair of mutually facing third walls hingedly coupled to the first wall; characterised by further comprising a closing wall comprising at least one panel hingedly coupled to one of the said second walls; said second walls, third walls, and the closing wall are movable between an upright configuration, in which the second walls are mutually parallel and perpendicular to the first wall, the third walls are mutually parallel and perpendicular to the first wall and to the second walls, and the closing wall is parallel to the first wall; and a folded configuration, in which said first wall, second walls, third walls, and closing wall are mutually parallel and overlapping; each of said second and third walls is connected to the first wall by a respective first connection hinge and the at least one panel is connected to a corresponding one of second walls by a respective second connection hinge; each first connection hinge is integral with the first wall and a respective one of the second and third walls; the second connection hinge is integral with the panel and the corresponding one of the second walls; and the first and second connection hinges are formed during a molding process of the foamed plastic container, wherein in the folded configuration, the mutually facing third walls are folded atop the first wall and are coplanar and the pair of second walls are folded atop the third walls and are coplanar.

2. The container according to claim 1, wherein the closing wall comprises two panels hingedly coupled to corresponding second walls.

3. The container according to claim 1, wherein, in the upright configuration, each panel is movable between an opening position and a closing position, in which the panel is arranged between the two second walls.

4. The container according to claim 3, wherein each panel is bounded by two mutually facing larger faces; and wherein, in the closing position, the panel and the corresponding second wall are in contact at respective coupling faces which are inclined with respect to the larger faces.

5. The container according to claim 4, wherein one of the coupling faces is provided with a protrusion and the other coupling face is provided with a recess made for receiving and holding the protrusion.

6. A mold for molding a foamed plastic foldable container comprising a first wall, a pair of mutually facing second walls hingedly coupled to the first wall, a pair of mutually facing third walls hingedly coupled to the first wall, and a closing wall comprising at least one panel hingedly coupled to one of said second walls, said second side walls, third walls, and the closing wall are movable between an upright configuration, wherein the second walls are parallel to one another and perpendicular to the first wall, the third walls are parallel to one another and perpendicular to the first wall and to the second walls, and the closing wall is parallel to the first wall; and a folded configuration, wherein said first wall, second walls, third walls, and closing wall are mutually parallel and overlapping; each panel of the closing wall is movable between an opening position and a closing position of the container in its upright configuration; the mold comprising a first half-mold and a second half-mold defining a molding chamber therebetween; the molding chamber is so shaped as to form said first wall, second walls and third walls in the upright configuration; and a first forming assembly to form, for each said second and third walls, a respective first connection hinge integral with each said second and third walls to connect the second walls and the third walls to the first wall; wherein the first half-mold and the second half-mold are configured to further form, in the molding chamber, each panel of the closing wall in the opening position; a second forming assembly is provided to form, for each panel of the closing wall, a respective second connection hinge to connect the panel to the corresponding second wall, wherein the respective second connection hinge is integral with the corresponding second wall, and wherein in the folded configuration, the mutually facing third walls are folded atop the first wall and are coplanar and the pair of second walls are folded atop the third walls and are coplanar.

7. The mold according to claim 6, wherein the second forming assembly comprises, for each second connection hinge, a respective forming device comprising, in turn, a compression member, which extends through a first variable-volume chamber in the first half-mold and communicating with the molding chamber; each compression member is movable between a rearward position, in which the first variable-volume chamber is enabled to receive a plastic material from the molding chamber, and a forward position, in which the compression member pushes the plastic material from the first variable-volume chamber into the molding chamber.

8. The mold according to claim 7, wherein the forming device further comprises a parting member movable between a forward position, in which, when the compression member is arranged in the rearward position, the parting member divides the space defined by the molding chamber and the first variable volume chamber into a first molding chamber shaped to form said first, second and third walls, and into a second molding chamber shaped to form the panel of the closing wall; and a rearward position, in which, when the compression member is arranged in the rearward position, said first and second molding chambers are in communication with each other.

9. The mold according to claim 8, wherein the parting member extends through the first half-mold.

10. The mold according to claim 8, wherein the parting member extends through, and slidably engage, the compression member to define, together with the compression member, a second variable-volume chamber.

11. The mold according to claim 8, wherein the forming device further comprises first and second drive means operable to independently move the compression member and the parting member between the relative forward and rearward positions.

12. The mold according to claim 6, wherein the first half-mold extends inside the second half-mold.

13. A method for molding a foamed plastic foldable container comprising a first wall, a pair of mutually facing second walls hingedly coupled to the first wall, a pair of mutually facing third walls hingedly coupled to the first wall, and a closing wall comprising at least a panel hingedly coupled to one of said second walls; said second walls, third walls, and closing wall are movable between an upright configuration, in which the second walls are mutually parallel and perpendicular to the first wall, the third walls are mutually parallel and perpendicular to the first wall and to the second walls, and the closing wall is parallel to the first wall, and a folded configuration, in which said first wall, second walls, third walls, and closing wall are mutually parallel and overlapping;

each panel of the closing wall is movable between an opening position and a closing position of the container in its upright configuration; the method comprising the steps of:
feeding a plastic material into a molding chamber to form said first wall, second walls, and third walls in the upright configuration; and
forming, for each of said second and third walls, a respective first connection hinge to connect the second walls and, respectively, the third walls to the first wall wherein the first connection hinge is integral with a respective one of the second and third walls;
feeding the plastic material into a molding chamber to mold each panel of the closing wall in the opening position; and
forming, for each panel of the closing wall, a respective second connection hinge to connect the panel to the corresponding second wall, wherein each panel is integral with the respective second connection hinge; and
wherein in the folded configuration, the mutually facing third walls are folded atop the first wall and are coplanar and the pair of second walls are folded atop the third walls and are coplanar.

14. The method according to claim 13, wherein the molding chamber is defined between a first half-mold and a second half-mold, and each second connection hinge is formed by a forming device comprising:
a compression member, which extends through a first variable-volume chamber in the first half-mold and communicating with the molding chamber, and is movable between a rearward position, in which the first variable-volume chamber is enabled to receive the plastic material from the molding chamber, and a forward position, in which the compression member pushes the plastic material from the first variable volume chamber into the molding chamber; and a parting member, which extends through the first variable-volume chamber, slidably engages the compression member, and is movable between a forward position, in which, when said compression member is arranged in the rearward position, the parting member divides the space defined by the molding chamber and the first variable volume chamber into a first molding chamber shaped to form said first, second and third walls, and into a second molding chamber shaped to form the panel of the closing wall; and a rearward position, in which, when the compression member is arranged in the rearward position, said first and second molding chambers are in communication.

15. The method according to claim 14, further comprising the steps of:

moving the parting member into the forward position and the compression member into the rearward position to define said first molding chamber and said second molding chamber; and feeding different plastic materials, in particular differently coloured, into the first molding chamber and, respectively, into the second molding chamber.

16. The method according to claim 14, wherein the compression member and the parting member are independently moved between the relative forward and rearward positions.

17. The method according to claim 14, wherein the forming of each second connection hinge comprises:

arranging the compression member in the rearward position and the parting member in the forward position;

feeding the plastic material from the molding chamber into the first variable-volume chamber;

moving the compression member from the rearward position to the forward position to push the plastic material from the first variable volume chamber into the molding chamber;

moving the parting member in the rearward position while maintaining the compression member in the forward position to cause the plastic material to fill a second variable-volume chamber defined between the compression member and the parting member; and moving the parting member in the forward position to compress the plastic material contained in the second variable-volume chamber and form the second connection hinge.

18. The method according to claim 17, further comprising the step of:

injecting steam into the plastic material when the compression member and the parting member are arranged in the forward positions.

19. The method according to claim 17, further comprising the steps of:

injecting steam into the plastic material when the compression member is arranged in the forward position and when the parting member is moved, firstly, from the forward position into the rearward position and then from the rearward position into the forward position.

* * * * *